(12) United States Patent
Espinosa (10) Patent No.: US 7,895,848 B2
(45) Date of Patent: *Mar. 1, 2011

(54) VACUUM STORAGE APPARATUS WITH SLIDING DRAWERS

(75) Inventor: Edward P. Espinosa, Boulder, CO (US)

(73) Assignee: Jeffrey S. Melcher, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/939,076

(22) Filed: Nov. 13, 2007

(65) Prior Publication Data

US 2008/0060376 A1 Mar. 13, 2008

Related U.S. Application Data

(63) Continuation of application No. 11/048,141, filed on Feb. 1, 2005, now Pat. No. 7,325,409.

(60) Provisional application No. 60/555,991, filed on Mar. 24, 2004, now abandoned.

(51) Int. Cl.
*F25B 19/00* (2006.01)

(52) U.S. Cl. ............................. 62/100; 62/268

(58) Field of Classification Search ............ 62/78, 169, 62/382, 268, 100, 176.1, 270, 441; 426/524, 426/231; 99/472
See application file for complete search history.

(56) References Cited

U.S. PATENT DOCUMENTS

| | | | |
|---|---|---|---|
| 1,404,400 A | | 1/1922 | Moon |
| 2,425,816 A | * | 8/1947 | Maxson ........................ 62/231 |
| 2,894,845 A | | 7/1959 | Stoddard |
| 3,116,610 A | | 1/1964 | Whitmore |
| 3,216,214 A | * | 11/1965 | Gasbarro ....................... 62/170 |
| 4,557,118 A | * | 12/1985 | Pink et al. ..................... 62/382 |
| 5,046,332 A | | 9/1991 | Hermann |
| 5,095,717 A | * | 3/1992 | Germi ............................ 62/382 |
| D326,663 S | * | 6/1992 | Kim .............................. D15/85 |
| 5,136,853 A | * | 8/1992 | Girardon et al. ................. 62/78 |
| 5,142,970 A | | 9/1992 | ErkenBrack |
| 5,157,940 A | * | 10/1992 | Bertu et al. .................... 62/382 |
| 5,195,427 A | | 3/1993 | Germano |
| 5,271,240 A | | 12/1993 | Detrick |
| 5,347,918 A | | 9/1994 | Chen |
| 5,494,165 A | * | 2/1996 | Detrick ...................... 206/524.8 |
| 5,522,216 A | | 6/1996 | Park |
| 5,605,047 A | | 2/1997 | Park |
| 5,806,575 A | * | 9/1998 | Tsay ............................. 141/65 |
| 5,946,919 A | | 9/1999 | McKinney |
| 5,964,255 A | * | 10/1999 | Schmidt ......................... 141/65 |
| 6,090,422 A | | 7/2000 | Taragan |
| 6,904,761 B2 | * | 6/2005 | Rafalovich et al. .......... 62/176.1 |
| 6,971,418 B2 | * | 12/2005 | De Costa ........................ 141/65 |
| 2003/0024278 A1 | * | 2/2003 | Berkey et al. ................... 65/428 |

FOREIGN PATENT DOCUMENTS

JP 2000-2479 A1 1/2000

* cited by examiner

*Primary Examiner* — Mohammad M Ali (74) *Attorney, Agent, or Firm* — Jeffrey S. Melcher; Manelli Denison & Selter PLLC (57) ABSTRACT

Provided is a modular vacuum storage apparatus and method for storing, dispensing, preserving and shipping perishable items.

27 Claims, 8 Drawing Sheets

VACUUM STORAGE APPARATUS WITH SLIDING DRAWERS

This application is a Continuation of U.S. application Ser. No. 11/048,141, filed 1 Feb. 2005, now U.S. Pat. No. 7,325, 409, issued 5 Feb. 2008, the complete disclosure of which is incorporated herein by reference. This application also claims priority to U.S. Provisional Patent Application Ser. No. 60/555,991, filed on 24 Mar. 2004, abandoned.

FIELD OF THE INVENTION

The invention relates to storing perishable foods and goods and, more particularly, to a modular vacuum storage apparatus and method for storing, dispensing, preserving and shipping perishable items.

BACKGROUND OF THE INVENTION

Removing heat from perishable foods and goods prior to storing or shipping them is a well-known technique with proven efficacy. Perishable goods are now stored or shipped routinely in all parts of the world. These measures can be enhanced by modifying and monitoring not only temperature, but also vacuum, humidity and gas mix levels in the surrounding food storage environment.

U.S. Pat. No. 5,946,919, issued to McKinney, et al., for FOOD CONSERVATOR SYSTEM on Sep. 7, 1999, discloses a single vacuum compartment appropriate for storing baked goods, in which a negative pressure of 10" Hg is maintained and wherein a humidity level of "at least about" 60% relative humidity is maintained. The environment of the compartment is feedback-controlled by a microprocessor. The microprocessor can control vacuum, relative humidity, temperature, the amount of ozone introduced into the compartment to retard bacterial growth, as well as, out-gassing time cycles. A menu allows a user to input data used to control the microprocessor, and permit optimization of the compartment environment for the particular foodstuffs presently being stored.

McKINNEY, et al., can include an ozone ultraviolet generator, a humidifier unit, and/or an activated charcoal chamber. Generating ozone and ultraviolet radiation helps retard or kill mold spores and other undesired components that may be present. The inclusion of an activated charcoal chamber helps further combat odors and removes carbon dioxide by-products.

The enclosure or compartment of McKinney, et al., however, has no mechanism for separating foodstuff or for accessing certain perishable items without accessing all of them. This is a serious drawback, as the vacuum is released when the front door is opened. Moreover, the temperature of all remaining perishable items is affected by the door opening in order to access other items or insert them into the compartment. Likewise, humidity is affected by such actions.

It would be advantageous to provide a perishable food and goods storage system capable of maintaining multiple compartments at predetermined vacuum, temperature, humidity and gas mix levels.

It would also be advantageous to provide a storage system that could accommodate a plurality of perishable foodstuff.

It would further be advantageous to provide a storage system that has a number of individually movable, modular drawers, each drawer being capable of holding different items.

It would still further be advantageous to provide a storage system with individual, movable, modular drawers with a single environmental control unit for the entire system.

It would still be further advantageous to provide a storage and dispensing system that uses one-way valve (or similar functioning mechanism) containers and/or bags to store, preserve and dispense items.

It would still be further advantageous to provide a system that automatically creates, maintains and releases various environments in respective storage units by modifying parameters such as: temperature, humidity, vacuum and gas mix levels and combinations thereof.

It would also be advantageous to program the apparatus to automatically turn off a particular operating system during peak usage to conserve electricity or for operation during specific time periods and intervals.

SUMMARY OF THE INVENTION

In accordance with the present invention, there is provided an apparatus for storing, preserving and dispensing perishable and degradable food, goods and materials for residential, commercial, and industrial applications. A rigid housing is provided, in which at least one modular unit is disposed. Physically removed from the modular unit is a vacuum pump for creating a partial vacuum environment. Optionally provided are operating systems to create, monitor, and maintain: temperature, humidity, and gas mix levels in the storage unit.

In the preferred embodiment, the modular unit is a slidable drawer. Moreover, more than one drawer can be provided, each drawer stacked above one another and all of the drawers being operatively connected to the vacuum pump and optionally to the temperature and humidity control device and the gas sourcing valve system.

The modular units can be either storage or processing units. The processing unit is designed to create a partial vacuum in one-way valve or similar functioning bags and containers placed into the unit.

The apparatus housings include closed and open frames and/or rack systems to hold single or multiple modular units. The modular units are standardized in size and coupling in order to allow the units to be moved from one housing to another. When a unit is removed from a closed housing another unit can replace it, or a cover can be placed into the housing opening to seal it. The removed modular units can be connected to portable operating systems and can be disposed side-by-side, like books on a shelf; or vertically stacked, like drawers in a dresser.

Furthermore, an apparatus can consist of a combination of processing and/or storage units and a closed housing can provide said units with or without a range of temperature.

BRIEF DESCRIPTION OF THE DRAWINGS

A complete understanding of the present invention may be obtained by reference to the accompanying drawings, when considered in conjunction with the subsequent detailed description in which.

DESCRIPTION OF THE PREFERRED EMBODIMENT

The invention can substantially extend the shelf-life, freshness and quality of a wide range of perishable and degradable items by controlling and/or eliminating their exposure to oxidation, moisture, insects, spoilage bacteria and other organic and non-organic chemical reactions that degrade items and accelerate ripening and decay.

The invention features a modular apparatus for storing, preserving and dispensing perishable and degradable food and goods. A rigid housing is provided, in which at least one modular unit is disposed. Physically removed from the modular unit is a vacuum pump 89 for creating a partial vacuum; a temperature control unit for creating and maintaining a range of temperature (for closed housings); a humidity control unit for maintaining or modifying the humidity level; and a gas sourcing valve system 90 for introducing and modifying the gas mix levels in each modular unit.

The apparatus offers a combination of unit environment settings applicable to preserve a wide range of perishable items. Multiple, independent and sealable drawers each have unique, preset storage environments depending upon use requirements. Each storage unit is engineered to store and preserve a particular type of perishable or degradable item. For example, food groups can consist of, but are not limited to: (1) breads and pastries; (2) dry goods (e.g., cereals, grains, herbs, coffee, etc.; (3) fruit; (4) vegetables; (5) meats; and (6) cheeses.

Figure 2:
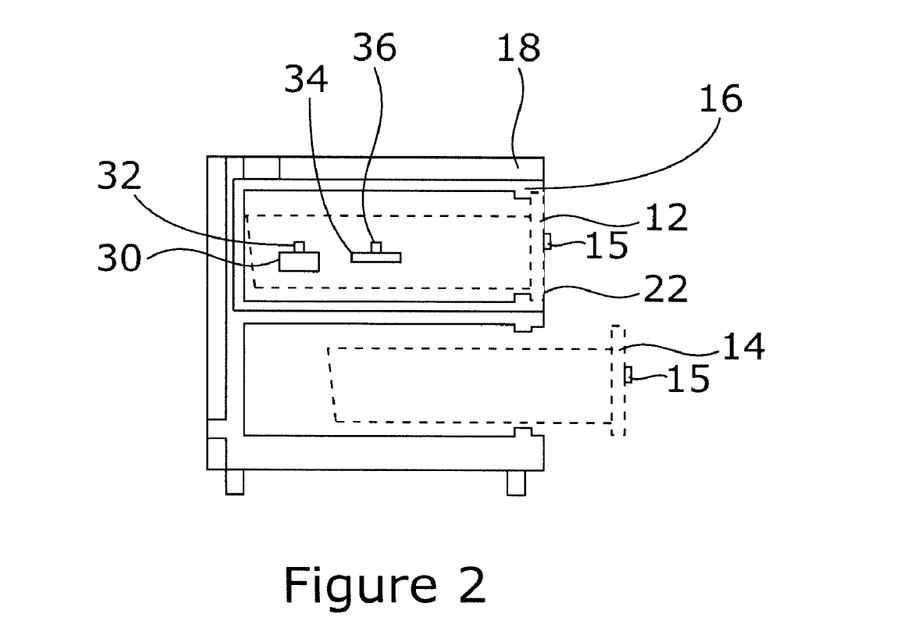
FIG. 2 is a side, cross section view of one embodiment of the invention.

The container processing unit is a modular unit designed to create a partial vacuum in one-way valve bags 34 and containers 30 (or variations thereof) to preserve the contents therein yet still store perishable items, as shown in FIG. 2. The one-way valves are shown at 32 for the container 30 and at 36 for bag 34.

When a processing unit is closed and sealed with a container inside, a sufficient preset partial vacuum is created within the processing unit, to in turn, create a partial vacuum environment within each respective container placed into the processing unit. When the processing unit is opened, the partial vacuum therein is automatically released; however, each processed container maintains its unique storage environment. The containers can then be inventoried either in the processing unit, in a storage unit, or in other storage areas (e.g., the refrigerator, pantry, etc.).

The method for storing, preserving, and dispensing perishable and degradable food and goods consists of the following steps. The operator places the items to be preserved or stored into a one-way valve (or similar functioning mechanism) container or bag (or variation thereof) and then closes and seals the container or bag. The operator then places the bag or container into the processing unit and then closes and seals the processing unit. The processing unit then creates a sufficient vacuum environment within the unit, to in turn, create a partial vacuum within each one-way valve container or bag in the processing unit. When the processing unit is opened and the partial vacuum is released, each bag or container retains its unique storage environment until the bag or container is opened. Single or multiple bags and containers can be processed simultaneously. This method is applicable to any compartment or space that can create a vacuum or partial vacuum.

The inventive apparatus is scalable. In the preferred embodiment the apparatus consists of single or multiple independent, sealable processing and/or storage units that operate mechanically as drawers. Each unit is affixed into an insulated housing in which a temperature control system circulates air around the respective unit. In alternate embodiments, each unit can be removed from its respective housing, while retaining its sealed environment, and can stand alone, be placed in another housing or can be connected to portable humidity, vacuum and gas operating systems.

The units can be vertically or horizontally attached to other units using interlocking mechanisms. The apparatus' components, housings, modular units, and operating systems can be standardized and interchangeable.

Each processing and storage unit consists of preset and independent environments 93 that are controlled, monitored and maintained by a centralized, preset programmable, microprocessing unit (CPU) 38. The CPU 38 communicates with the operating systems and the sensors and controls in each respective modular unit to create unique partial vacuum storage environments 93 that may be modified by humidity, gas sourcing and temperature systems.

Operating systems are located outside of the respective storage unit environment. Each operating system connects to the CPU and the respective storage unit. The operating systems consist of a commonly shared vacuum pump and optionally a combination of any of the following: temperature control system (in the closed housing), relative humidity system, and gas sourcing valve system 90. The operating systems can also include ozone, filtration systems (e.g., activated charcoal) and any other systems to minimize odor and control bacterial growth.

Figure 1:
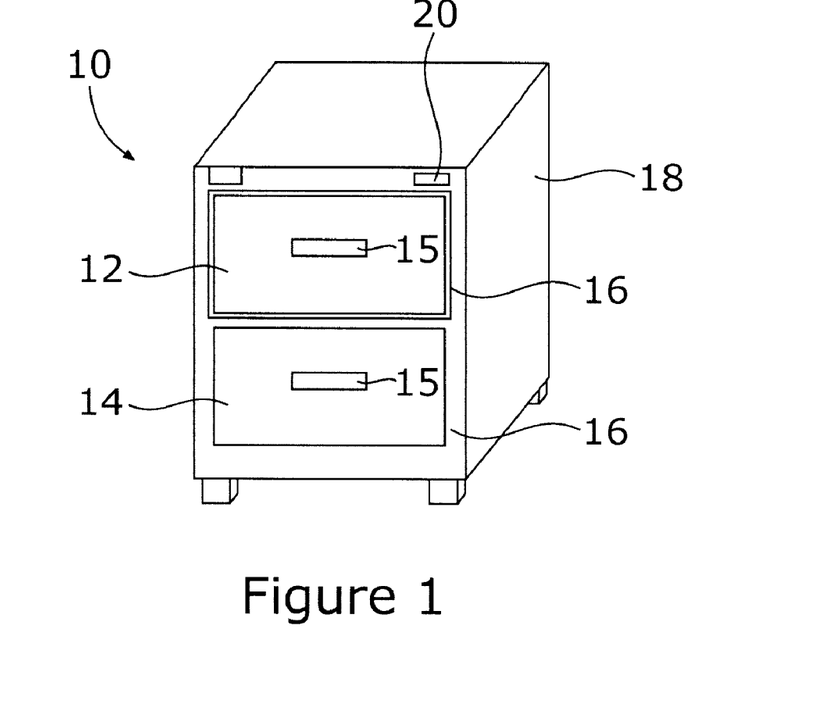
FIG. 1 is a perspective view of the apparatus in accordance with the invention.

Referring now to FIG. 1, the preferred embodiment contemplates single or multiple drawers, and here is shown a vacuum storage apparatus 10 with two slidable drawers 12, 14, each having a handle/latch mechanism 15, in a sealable storage unit 16 that is affixed to an insulated rigid housing 18. At least one of the drawers 12, 14 is slidable and can be removed from the storage unit 16. Air is circulated around each storage unit 16 in the housing 18 with the respective functions controlled and monitored by sensors 50 (FIG. 3) via a control/display panel 20. In this embodiment, the modular unit described above comprises the storage unit 16 containing the drawer 14.

Referring now to FIG. 2, when a storage unit 16, shown having a drawer 12 to provide a sealed space, is removed (shown in FIG. 4), a created environment within the storage unit 16 and drawer can be maintained. In this embodiment, the modular unit described above comprises the storage unit 16 containing the drawer 12.

The drawer 14 is shown in FIG. 2 as being partially open inside the rigid housing 18 and not within a storage unit 16 and, thus, in this embodiment, the modular unit described above comprises the drawer 14 without a storage unit 16. Furthermore, the storage unit 16 can be placed into other rigid housings such as closed or open frames and rack systems or function independently of any housing. The storage unit 16 when removed from its rigid housing can be vertically and/or horizontally stacked and connected to portable vacuum, gas sourcing and humidity operating systems. The storage unit 16 is removed from or replaced into the rigid housing 18 by use of manual connection fittings and retractable operating system lines for the respective storage unit functions (vacuum, humidity, gas mix and control panel), in a manner well known in the art.

A hinged door 22 can optionally be provided to seal the housing 18 holding the storage unit 16 to maintain the temperature for the housing and unit.

Figure 8:
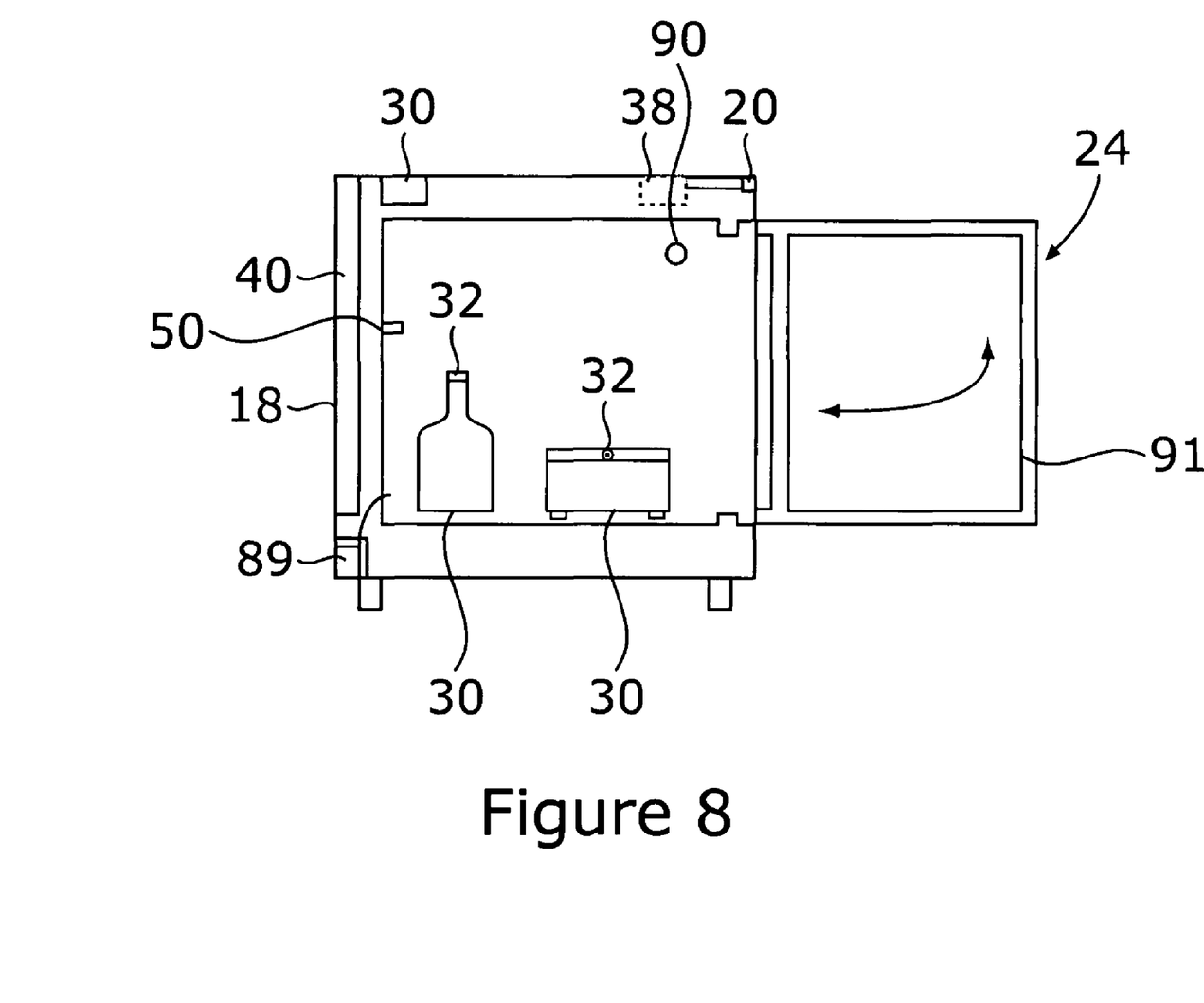
FIG. 8 is a side, cross section view of an alternate embodiment of the invention showing the storage unit with a door adapted to seal the storage unit.
Figure 9:
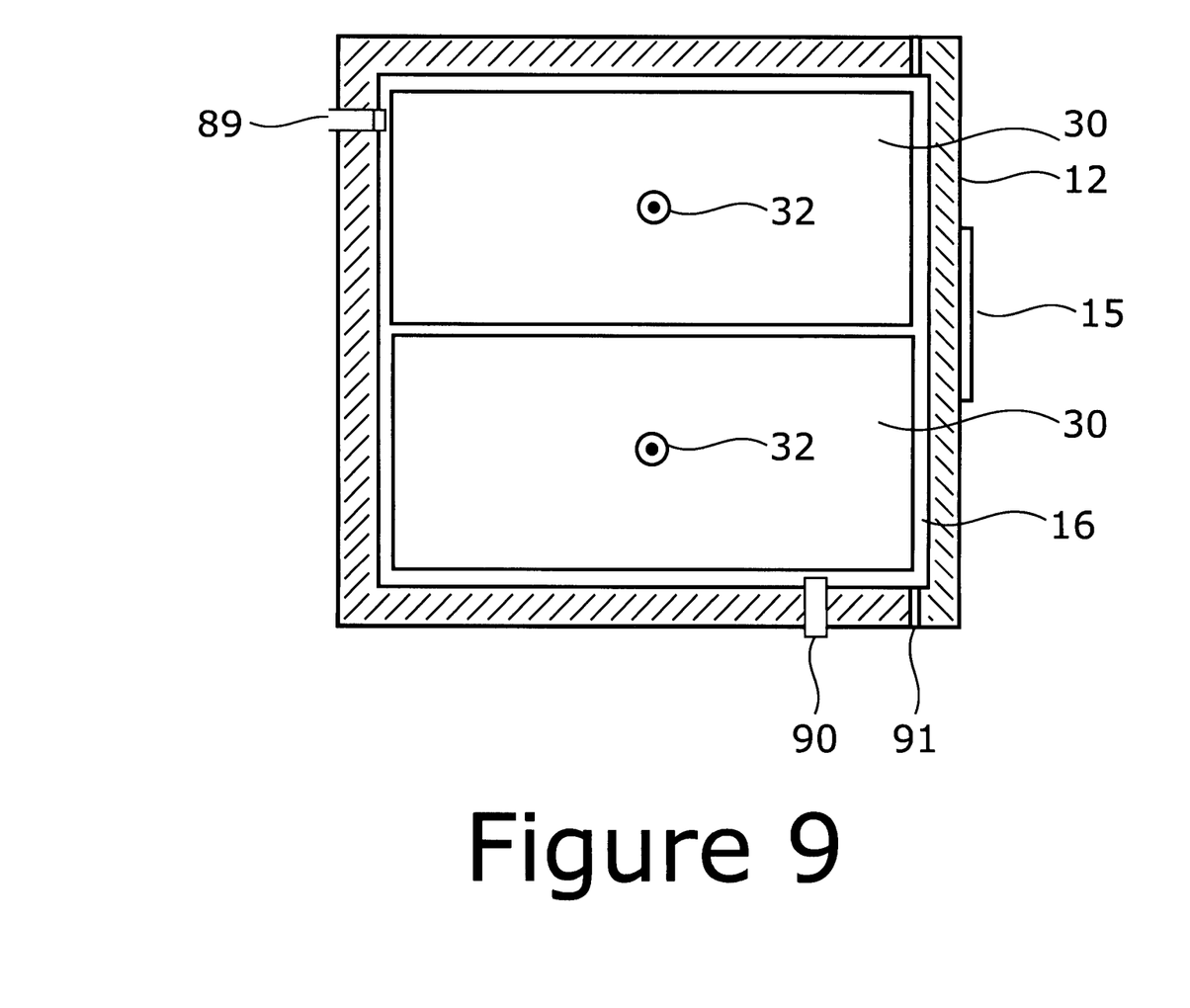
FIG. 9 is a top, cross section view of an alternate embodiment of the invention showing two sealed one-way valve containers proportionately reducing the vacuum volume of the storage unit by their respective vacuum volume and being stored in a thermos effect environment whereby the vacuum inside the storage unit insulates the containers from the surfaces of the storage unit.
Figure 10:
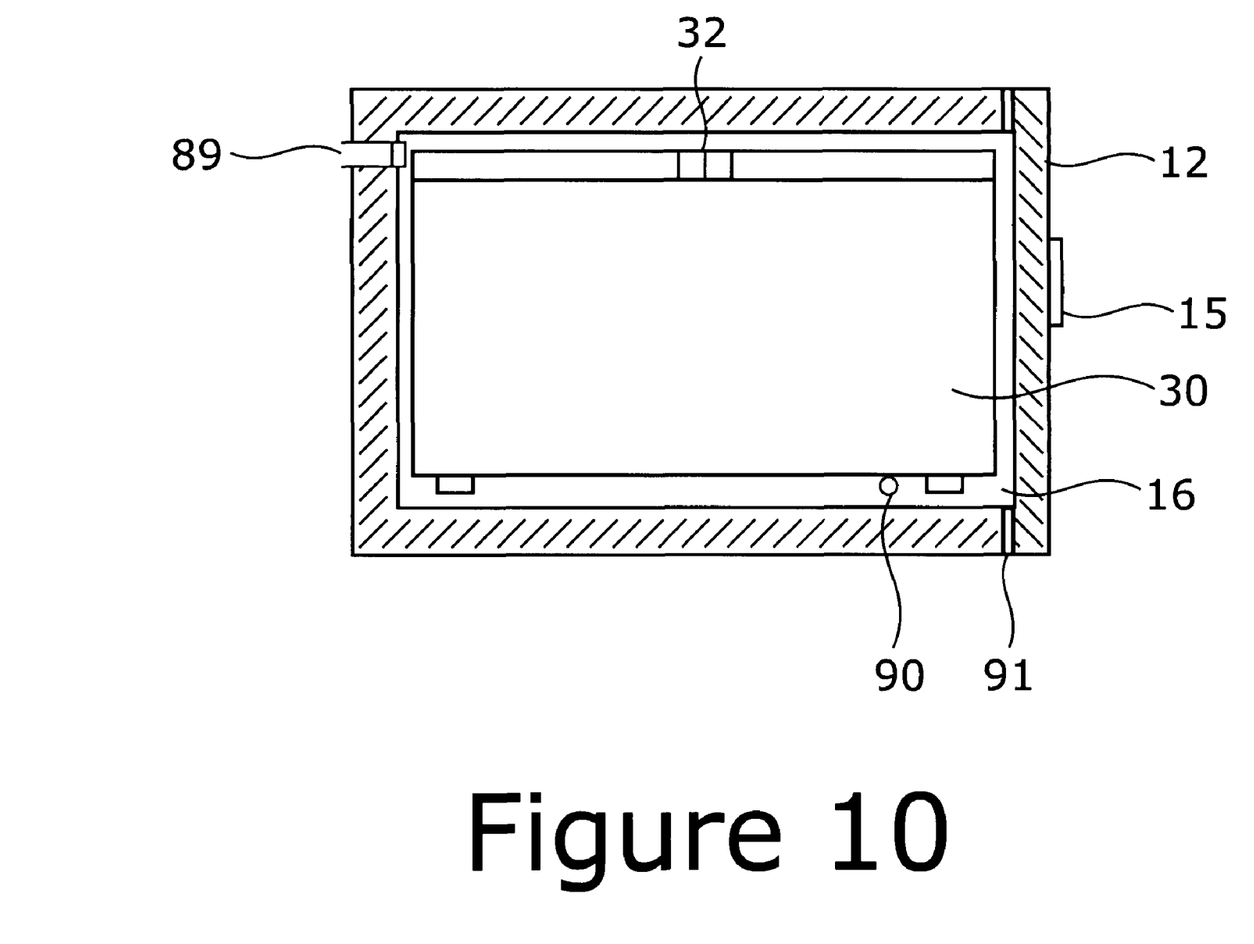
FIG. 10 is a side, cross section view of FIG. 9 showing the sealed one-way valve containers proportionately reducing the vacuum volume of the storage unit by their respective vacuum volume and being stored in a thermos effect environment whereby the vacuum inside the storage unit insulates the containers from the surfaces of the storage unit.

Storage unit 16 can also include a removable or hinged lid 24 (shown in FIG. 8) that opens and closes the storage space. When the lid 24 is closed, a seal 91, illustrated in FIG. 8, allows a partial vacuum to be created. When the lid 24 is opened, to add or remove items, the vacuum environment is previously released. The removable or hinged lid 24 can also include latches 26.

Figure 3:
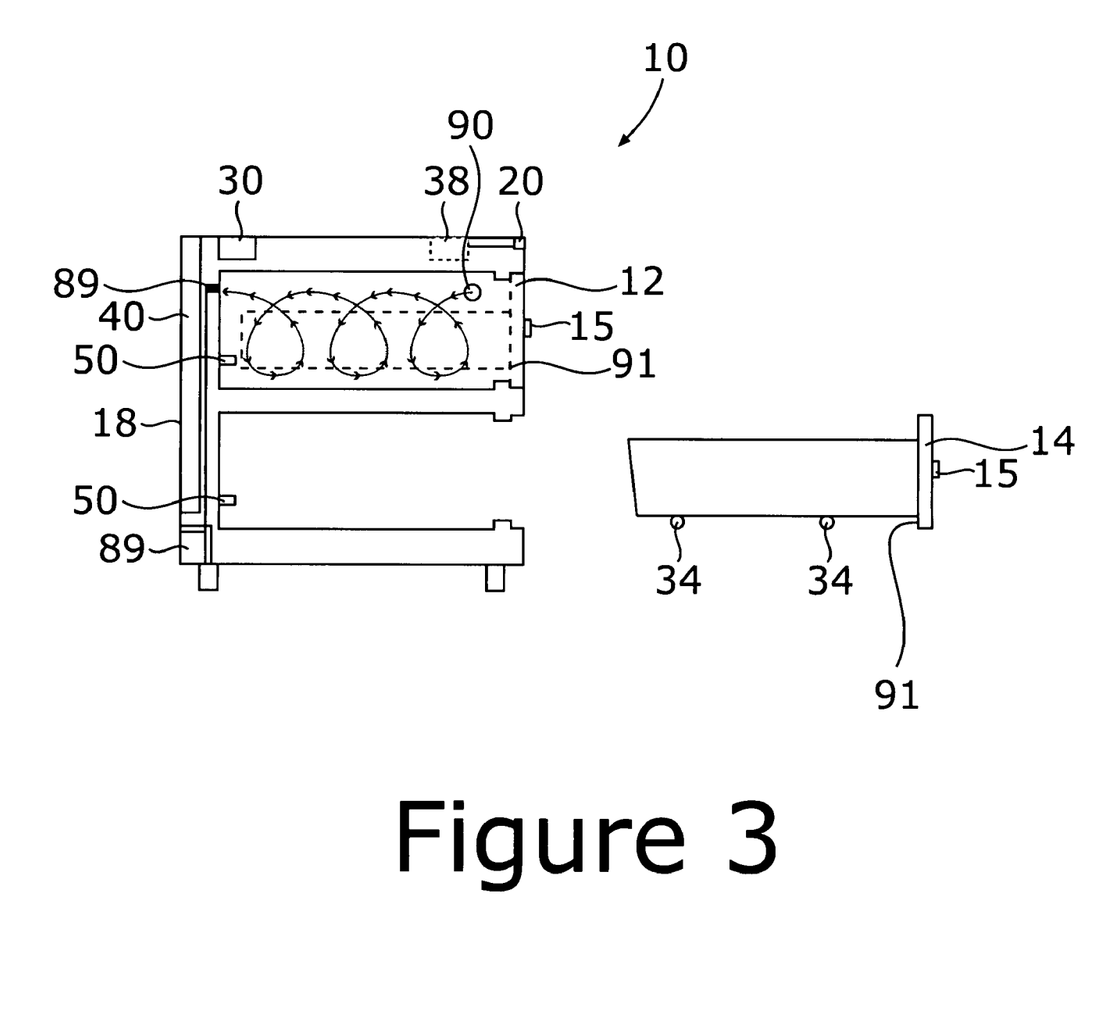
FIG. 3 is a side, cross section view of an alternate embodiment of the invention depicting air circulating around the interior of the top storage unit when the storage unit valve is open and the vacuum means is simultaneously activated.

Referring now to FIG. 3, there is shown the apparatus 10 with drawer 14 removed from housing 18 and drawer 12 seated inside housing 18. A well or reservoir 30 is provided with a suitable lid, not shown, for receiving water for use by a humidifier, not shown, operatively connected to or in housing 18. Rollers 34 are rotatably affixed to the lower portion of each drawer 12, 14 or into housing 18 to facilitate sliding thereof. In this embodiment, the modular unit described above comprises the drawers 12 and 14 without the use of storage unit 16.

Also integral with housing 18 is a vacuum pump 89, electrically operated under control of a microprocessor 38 and control/display panel 20. A hot/cold temperature control subsystem 40 is disposed at the rear of housing 18 and, again, operated under control of a microprocessor 38 and control/display panel 20. A humidity line 44, not shown, is attached to each respective drawer 12, 14 when seated in housing 18 to create and maintain the desired level or range of humidity therein.

Figure 4:
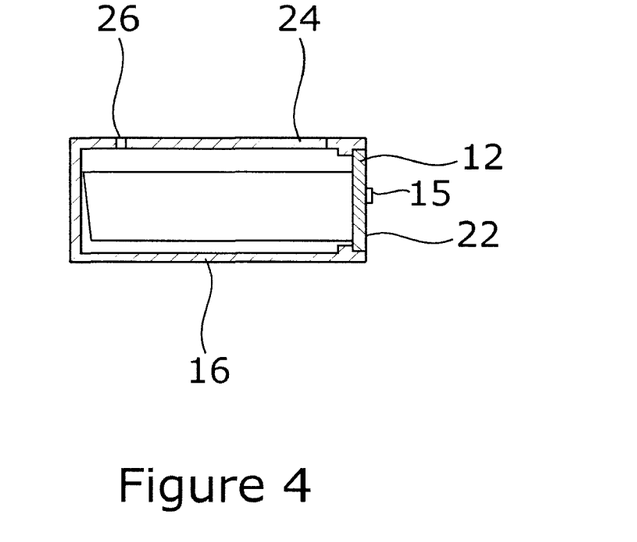
FIG. 4 is a side, cross section view of a modular unit shown in FIG. 2 removed from the rigid housing.
Figure 5:
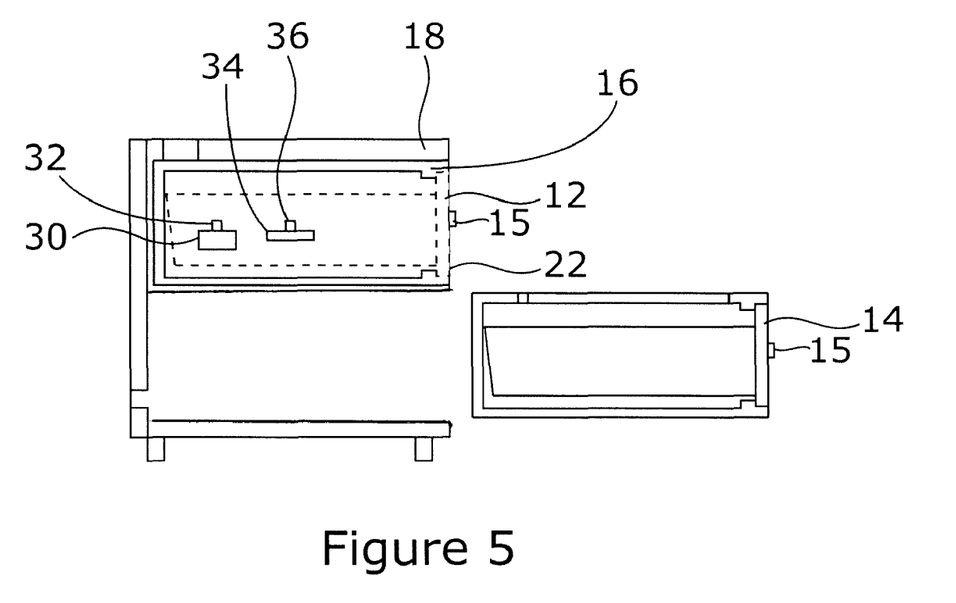
FIG. 5 is a side, cross section view of an alternate embodiment of the invention.
Figure 6:
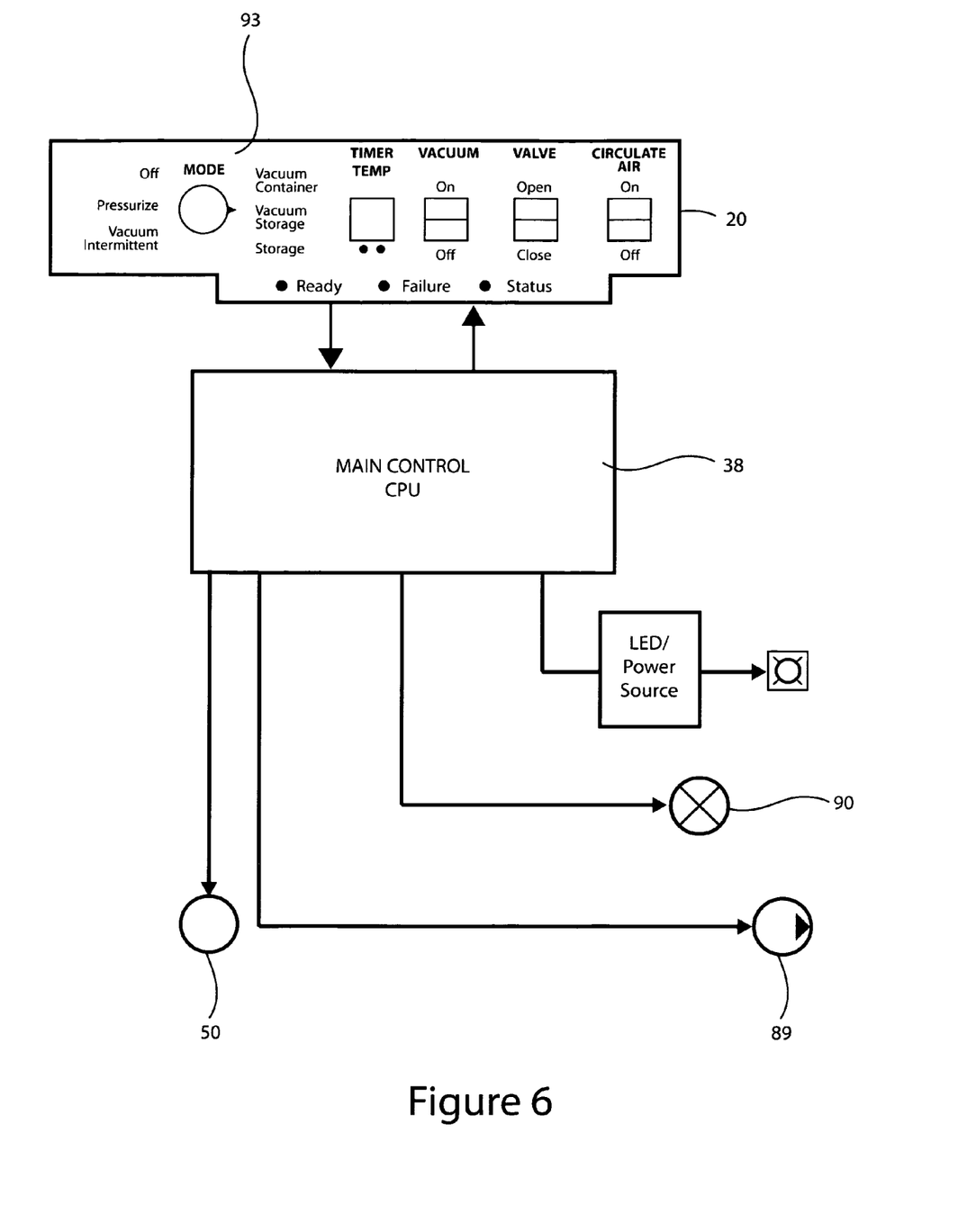
FIG. 6 is a schematic depiction of the vacuum storage system of the present invention.
Figure 7:
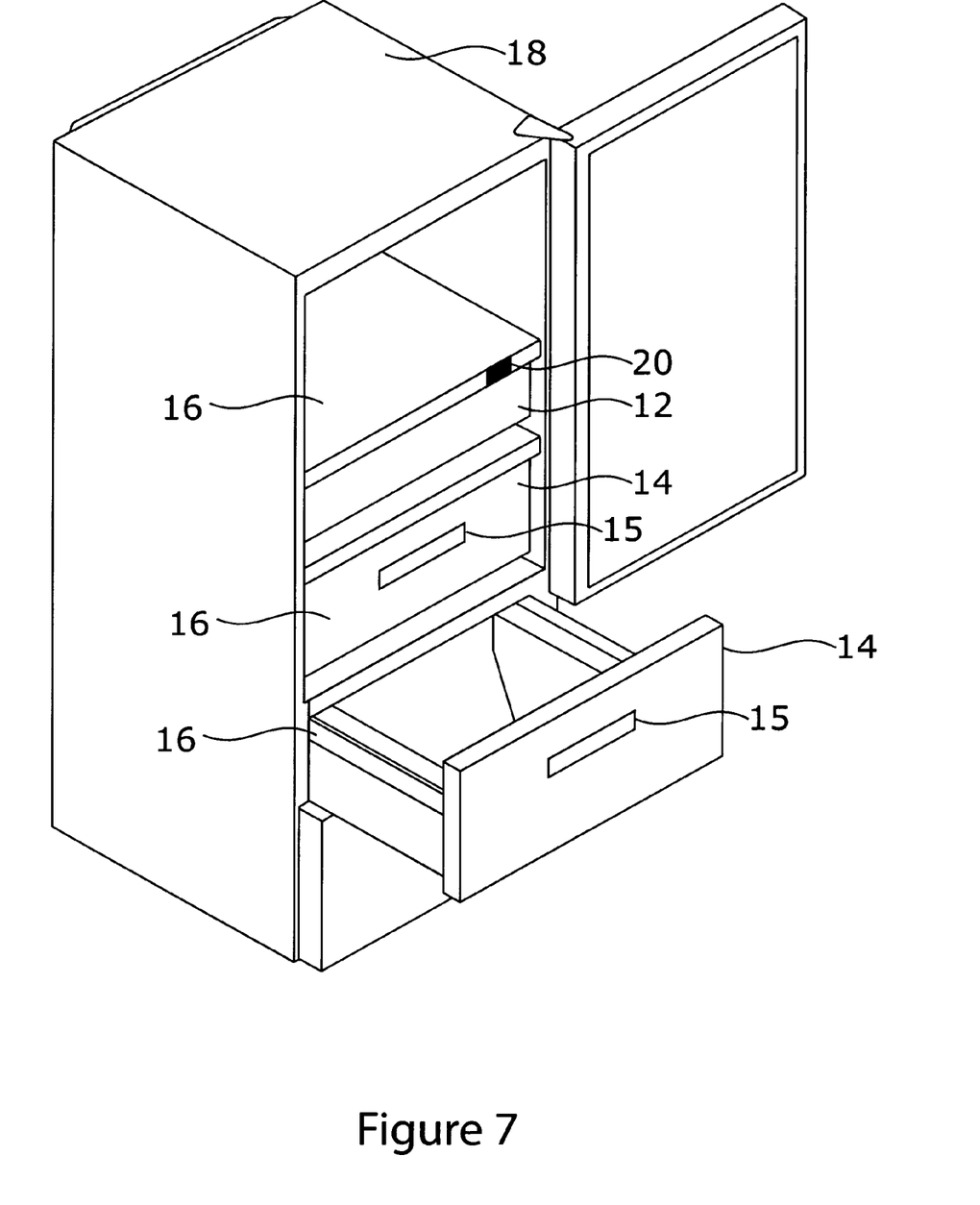
FIG. 7 is a perspective view of either a refrigerator or freezer including vacuum storage systems of the present invention.

Temperature, vacuum, gas mix and humidity sensors 50 are provided for each storage unit 12, 14 supported by housing 18. The bank of sensors 50 is electrically connected to microprocessor 38. In the preferred embodiment, sensors 50 are also connected to suitable valves and couplings that mate with respective sockets 50a, not shown, on the rear portions of drawers 12, 14. Other configurations of sockets, sensors, FIG. 4 illustrates the modular unit comprising a storage unit 16 (also shown in FIG. 2) removed from the rigid housing (shown at 18 in FIG. 2). The storage unit 16 is shown with the optional hinged top 24 and latches 26.

Since other modifications and changes can vary to fit particular operating requirements and environments and will be apparent to those skilled in the art, the invention is not considered limited to the example chosen for purposes of disclosure, and covers all changes and modifications which do not constitute departures from the true spirit and scope of this invention.

Having thus described the invention, what is described to be protected by Letters Patent is presented in the subsequently appended claims:

1. An apparatus for storing, preserving and dispensing perishable and degradable food and goods comprising:
    a) a rigid housing;
    b) at least one modular unit disposed in said housing, the modular unit comprising a storage unit for holding items having a drawer, the storage unit being constructed and arranged such that the drawer sealingly closes the storage unit, such that when the drawer is opened coolant is retained between the storage unit and the rigid housing;
    c) means operatively connected to, but physically removed from, said modular unit for creating a partial vacuum inside the modular unit;
    d) means for sealing and maintaining said partial vacuum inside the modular unit; and
    e) means operatively connected to, but physically removed from, said modular unit for creating and maintaining a predetermined temperature inside the rigid housing.

2. The apparatus for storing, preserving and dispensing perishable and degradable food and goods in accordance with claim 1, further comprising a plurality of modular units, all of said modular units being operatively connected to said means for creating a partial vacuum.

3. The apparatus for storing, preserving and dispensing perishable and degradable food and goods in accordance with claim 2, wherein said plurality of modular units are stacked one above the other.

4. The apparatus for storing, preserving and dispensing perishable and degradable food and goods in accordance with claim 1, further comprising: f) means operatively connected to, but physically removed from, said modular unit for creating and maintaining a predetermined range of humidity therein.

5. The apparatus for storing, preserving and dispensing perishable and degradable food and goods in accordance with claim 1, wherein said apparatus is a compartment of a refrigerator.

6. The apparatus for storing, preserving and dispensing perishable and degradable food and goods in accordance with claim 1, further comprising at least one container or bag within the modular unit, the container or bag having a one-way valve such that when a partial vacuum is created within the modular unit a partial vacuum is also created within each container or bag therein.

7. The apparatus for storing, preserving and dispensing perishable and degradable food and goods in accordance with claim 1, wherein said apparatus comprises a control panel that is programmable and provides preset environment settings to operate the apparatus and each operating system to create, regulate and maintain the temperature, vacuum and humidity levels, and combinations thereof, for the respective environments for each storage and processing unit.

8. The apparatus for storing, preserving and dispensing perishable and degradable food and goods in accordance with claim 1, wherein said modular unit is removably disposed in said housing.

9. The apparatus for storing, preserving and dispensing perishable and degradable food and goods in accordance with claim 1, wherein said apparatus comprises a stand-alone apparatus.

10. The apparatus according to claim 1, further comprising a valve connected to the modular unit and to the means for creating a partial vacuum to control the partial vacuum inside the modular unit.

11. The apparatus according to claim 10, further comprising a control system connected to the means for creating a partial vacuum and the valve for establishing and automatically controlling the partial vacuum inside the modular unit.

12. The apparatus according to claim 11, wherein the control system is configured to automatically create, maintain or release the partial vacuum inside the modular unit.

13. The apparatus according to claim 11, wherein the control system is configured to automatically maintain a humidity in the modular unit.

14. An apparatus for storing, preserving and dispensing perishable and degradable food and goods comprising:
  a) at least one modular unit comprising a storage unit for holding items, having a drawer, further comprising at least one container or bag inside the modular unit, the container or bag having a one-way valve such that when a partial vacuum is created inside the modular unit a partial vacuum is also created inside each independently sealed one-way valve container or bag therein;
  b) means operatively connected to, but physically removed from, said modular unit for creating a partial vacuum inside the modular unit and inside each one-way valve container or bag therein;
  c) means for sealing and maintaining said partial vacuum inside the modular unit; and
  d) the modular unit and each one-way valve container and bag being constructed and arranged such that when the partial vacuum, or part thereof, is released from inside the modular unit a partial vacuum is retained inside each independently sealed one-way valve container or bag therein.

15. The apparatus for storing, preserving and dispensing perishable and degradable food and goods in accordance with claim 14, further comprising a plurality of modular units, all of said modular units being operatively connected to said means for creating a partial vacuum.

16. The apparatus for storing, preserving and dispensing perishable and degradable food and goods in accordance with claim 15, wherein said plurality of modular units are stacked one above the other.

17. The apparatus for storing, preserving and dispensing perishable and degradable food and goods in accordance with claim 14, further comprising: f) means operatively connected to, but physically removed from, said modular unit for creating and maintaining a predetermined range of humidity therein.

18. The apparatus for storing, preserving and dispensing perishable and degradable food and goods in accordance with claim 14, wherein said apparatus is a compartment of a refrigerator.

19. The apparatus for storing, preserving and dispensing perishable and degradable food and goods in accordance with claim 14, wherein said modular unit is removably disposed in said housing.

20. The apparatus according to claim 14, further comprising a control system for establishing and automatically controlling the partial vacuum inside the modular unit and inside each one-way valve container or bag therein.

21. The apparatus according to claim 20, wherein the control system is constructed to automatically regulate the temperature in the modular unit.

22. The apparatus according to claim 20, wherein the control system is constructed to automatically control the humidity in the modular unit.

23. The apparatus according to claim 20, further comprising a display panel connected to the control system.

24. A method for storing, preserving and dispensing perishable and degradable food and goods comprising the following steps:
  a) placing items into a one-way valve container or bag and closing and sealing said container or bag;
  b) closing and sealing the modular unit with said sealed one-way valve container or bag inside the modular unit;
  c) creating a partial vacuum environment inside the modular unit, to in turn, create a partial vacuum environment inside each sealed one-way valve container or bag therein; and
  d) when the partial vacuum, or part thereof, is released from inside the modular unit a partial vacuum is retained inside each independently sealed one-way valve container or bag therein.

25. A method for storing, preserving and dispensing perishable and degradable food and goods according to claim 24, wherein the modular unit is disposed in a rigid housing for holding items, the modular unit comprising a storage unit having a drawer, the storage unit being constructed and arranged such that the drawer sealingly closes the storage unit, such that when the drawer is opened coolant is retained between the storage unit and the rigid housing, the partial vacuum being created by means operatively connected to, but physically removed from, said modular unit for creating a partial vacuum in the modular unit, further comprising creating a desired temperature within the modular unit by using means operatively connected to, but physically removed from, said modular unit for creating and maintaining the predetermined temperature in the rigid housing.

26. The method according to claim 25, further comprising a plurality of modular units, all of said modular units being operatively connected to said means for creating a partial vacuum.

27. The method according with claim 25, wherein said modular unit is removably disposed within the rigid housing.

\* \* \* \* \*